United States Patent [19]

Williams et al.

[11] Patent Number: 5,125,376
[45] Date of Patent: Jun. 30, 1992

[54] MODULAR ACCESSORY MOUNTING APPARATUS FOR HEAVY DUTY ENGINES

[75] Inventors: J. Larry Williams, Fort Wayne, Ind.; Melvin A. Kautz, Washington, Mich.

[73] Assignee: Navistar International Transportation Corp., Chicago, Ill.

[21] Appl. No.: 766,483

[22] Filed: Sep. 25, 1991

[51] Int. Cl.$^5$ ............................................. F02F 7/00
[52] U.S. Cl. ................................................. 123/195 A
[58] Field of Search ............ 123/195 A, 195 C, 198 B

[56] References Cited

U.S. PATENT DOCUMENTS

| | | | |
|---|---|---|---|
| 2,875,746 | 3/1959 | Brice et al. | 123/195 A |
| 3,730,147 | 5/1973 | Buchwald | 123/195 A |
| 4,697,782 | 10/1987 | Ban | 123/195 A |

FOREIGN PATENT DOCUMENTS

| | | | |
|---|---|---|---|
| 208716 | 9/1960 | Austria | 123/195 A |
| 3642430 | 10/1988 | Fed. Rep. of Germany | 123/195 A |

Primary Examiner—Noah P. Kamen
Attorney, Agent, or Firm—Dennis K. Sullivan

[57] ABSTRACT

An accessory mounting apparatus for use on a heavy duty truck engine comprises a unitary bracket having parallel lateral walls defining an interior cavity which securingly receives a side portion of a front engine cover. The lateral walls extend to an outermost ear portion, to which an alternator is mounted in depending relationship, and upwardly to a horizontal plate portion having a mounting pad forward of the ear portion to which a coolant corrosion filter is dependingly mounted, and a mounting platform rearwardly inwardly of the mounting pad to and above which an air conditioning compressor is mounted, and forwardly extending boss attached to a forward wall of the bracket to which a constant tension pulley assembly is mounted to tension a belt which drives the compressor.

15 Claims, 3 Drawing Sheets

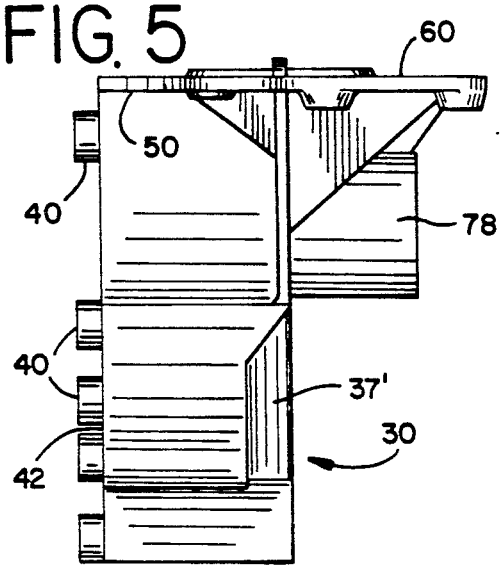
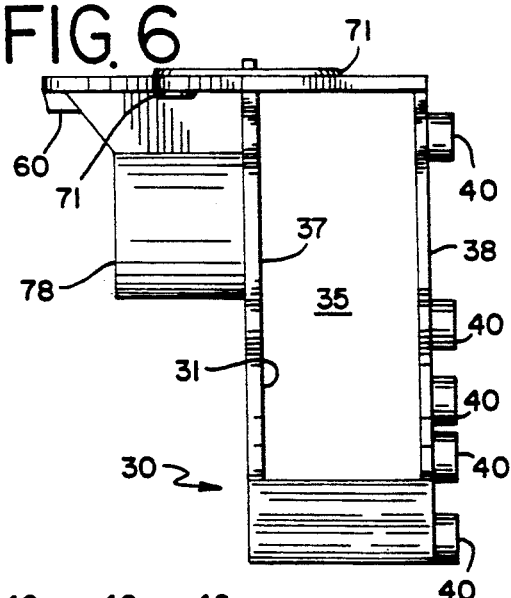
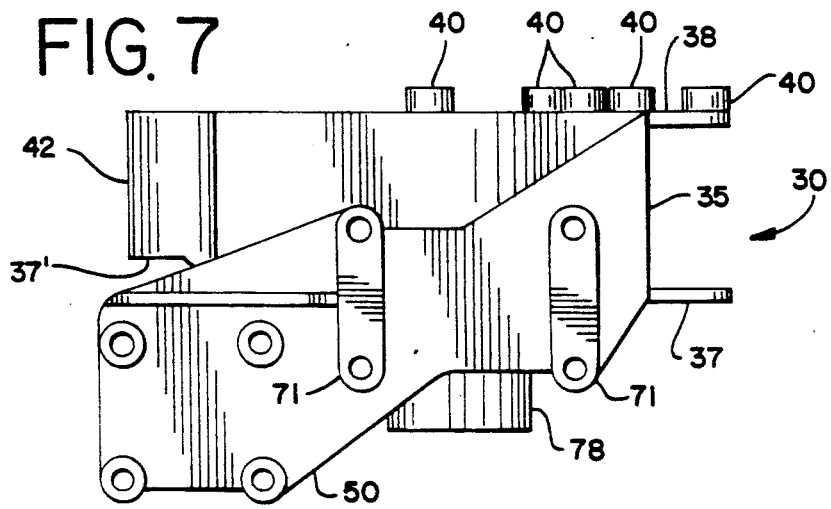
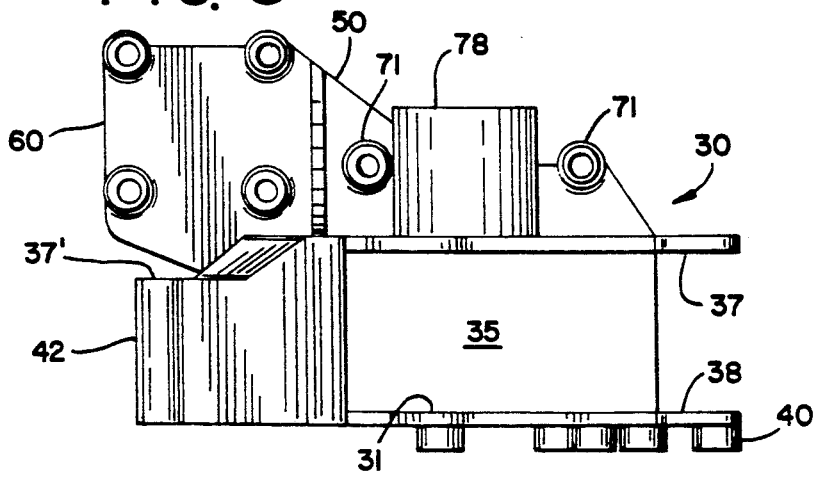

MODULAR ACCESSORY MOUNTING APPARATUS FOR HEAVY DUTY ENGINES

BACKGROUND OF THE INVENTION

The present invention relates to the mounting of belt driven accessories, such as an alternator and an air conditioning compressor, and certain nondriven accessories, such as a coolant conditioner element, on heavy duty truck engines and, more particularly, to a modular accessory mounting apparatus incorporating various accessory mountings into a singular mounting and attachment structure which accommodates not only an alternator mounting with alternator drive belt adjustment capability and a coolant system conditioning element mounting, but also an air conditioning compressor mounting and an automatic drive belt tensioner therefor.

THE PRIOR ART

Heretofore, the typical heavy truck diesel engine has been provided with individual mountings for each of the above defined components resulting in high labor costs and material inventory. For example, the air conditioning compressor drive belt idler pulley is usually separately mounted to an engine front cover, and the alternator and coolant conditioner are mounted on separate brackets. Also the drive belts for the various components have previously required intermittent tensioning to assure satisfactory driving of the components. These requirements alone result in increased assembly plant labor as well as increased maintenance costs.

SUMMARY OF THE INVENTION

It is a primary object of the present invention to achieve substantial labor reduction by integrating the functional mounting of several accessory components into a single bracket attached to the engine, as well as to eliminate down time and labor costs incurred in manual belt tensioning by providing automatic belt tensioning for the air conditioning compressor drive system, service of belt drive system only being required when the belt fails.

According to the invention, there is provided a modular accessory mounting apparatus including a bracket having an aperture for pivotally mounting an alternator to provide drive belt adjustment capability, a support member for mounting a coolant system conditioning element header in depending relation therefrom forwardly of the alternator mounting, a mounting pad for an air conditioning compressor thereabove, and a mounting pad perpendicular to said air conditioning mounting pad for an automatic belt tensioning idler.

BRIEF DESCRIPTION OF THE DRAWINGS

Other objects and advantages of the invention will become more apparent upon perusal of the detailed description thereof and upon inspection of the drawings in which:

FIG. 5 is a right side view of the bracket of FIG. 3;

FIG. 6 is a left side view of the bracket of FIG. 3;

FIG. 7 is a top view of the bracket of FIG. 3; and,

FIG. 8 is a bottom view of the bracket of FIG. 3.

DESCRIPTION OF THE PREFERRED EMBODIMENT

Figure 2:
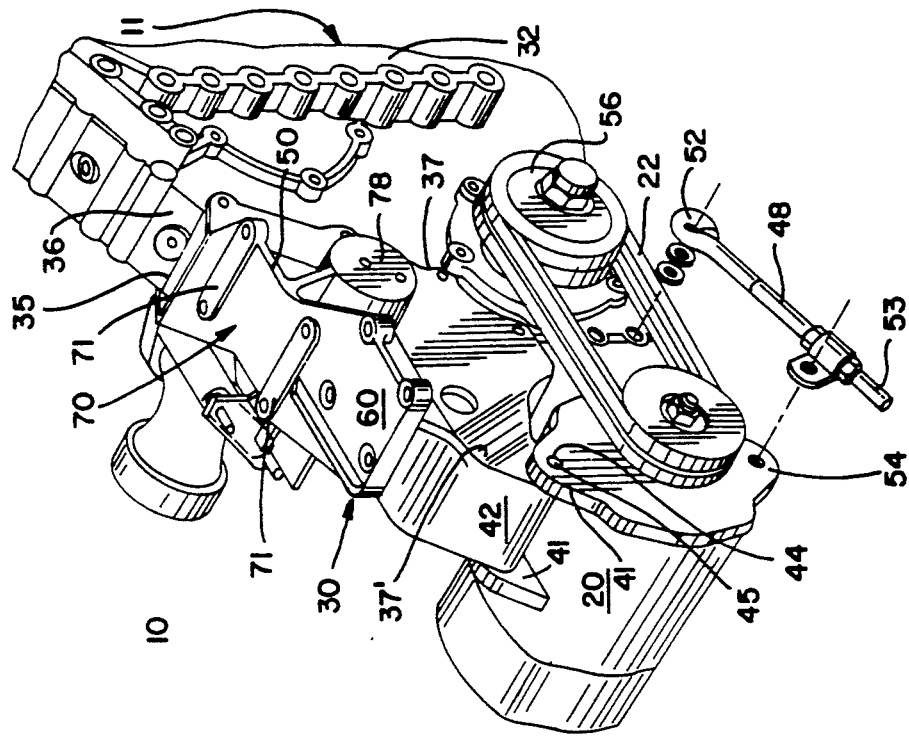
FIG. 2 is a perspective view similar to FIG. 1 but showing the engine with only the alternator mounted thereon.
Figure 1:
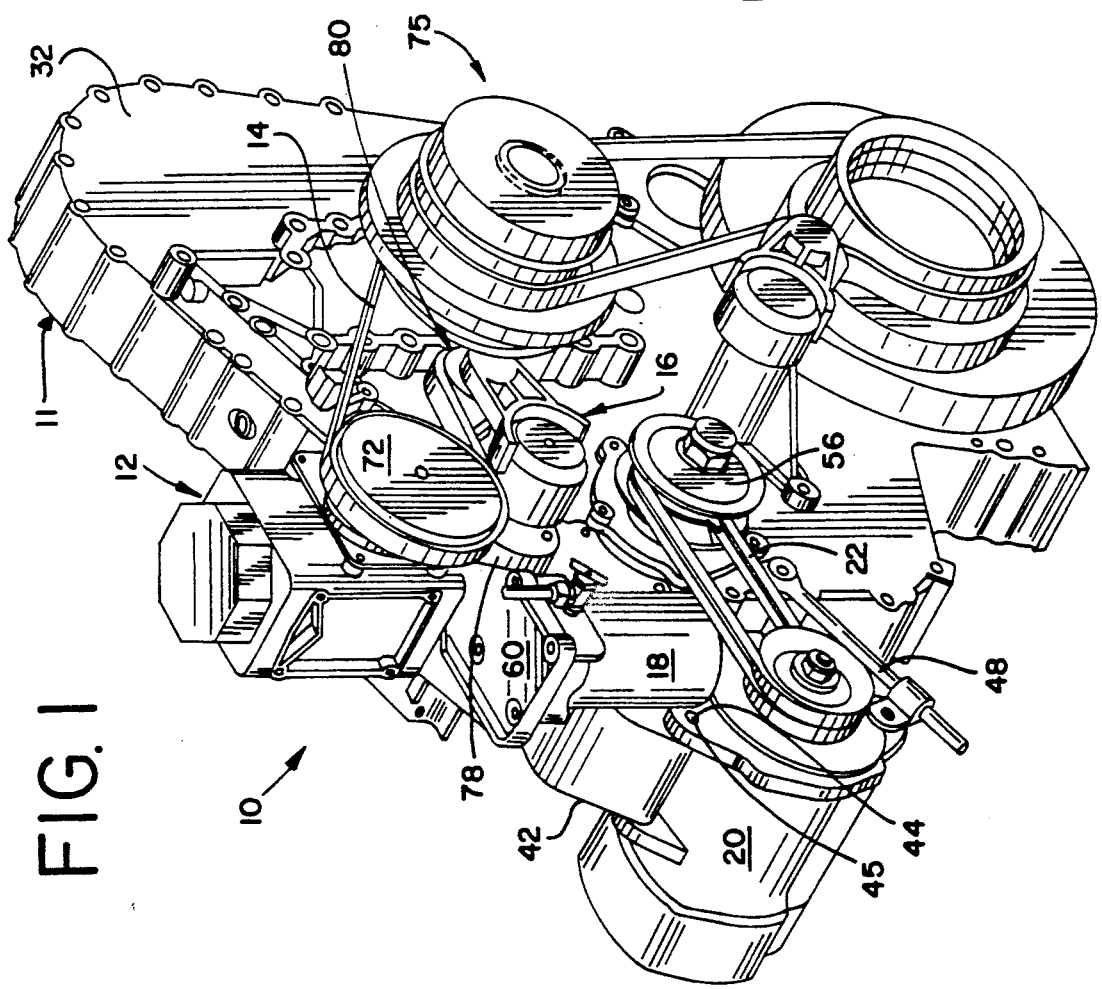
FIG. 1 is a perspective view of a front portion of an engine incorporating the modular accessory mounting apparatus of the present invention showing associated components mounted thereon.
Figure 3:
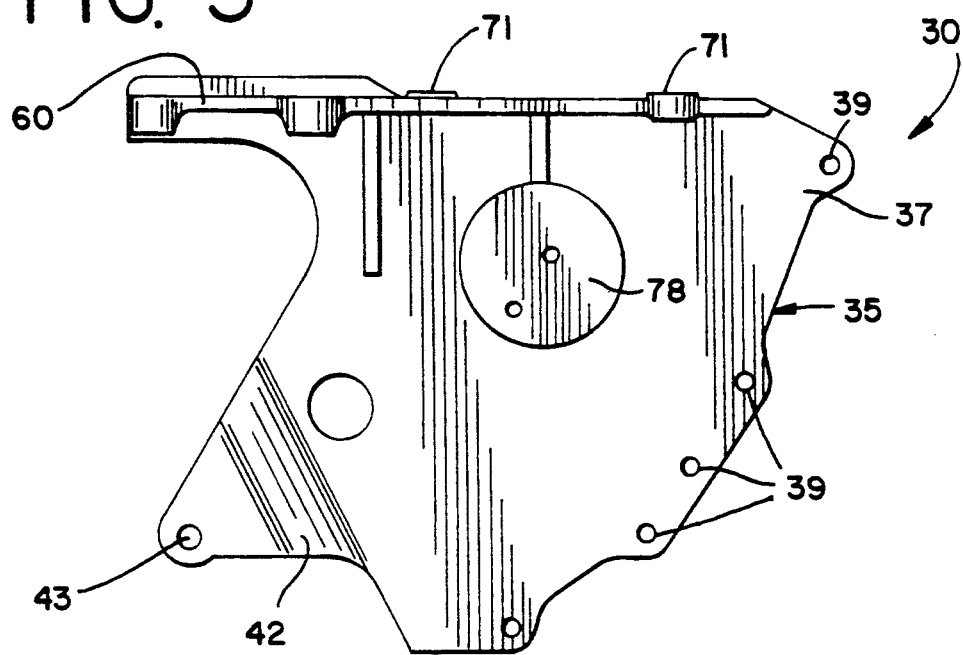
FIG. 3 is a front view of bracket associated with the apparatus of FIG. 1.
Figure 4:
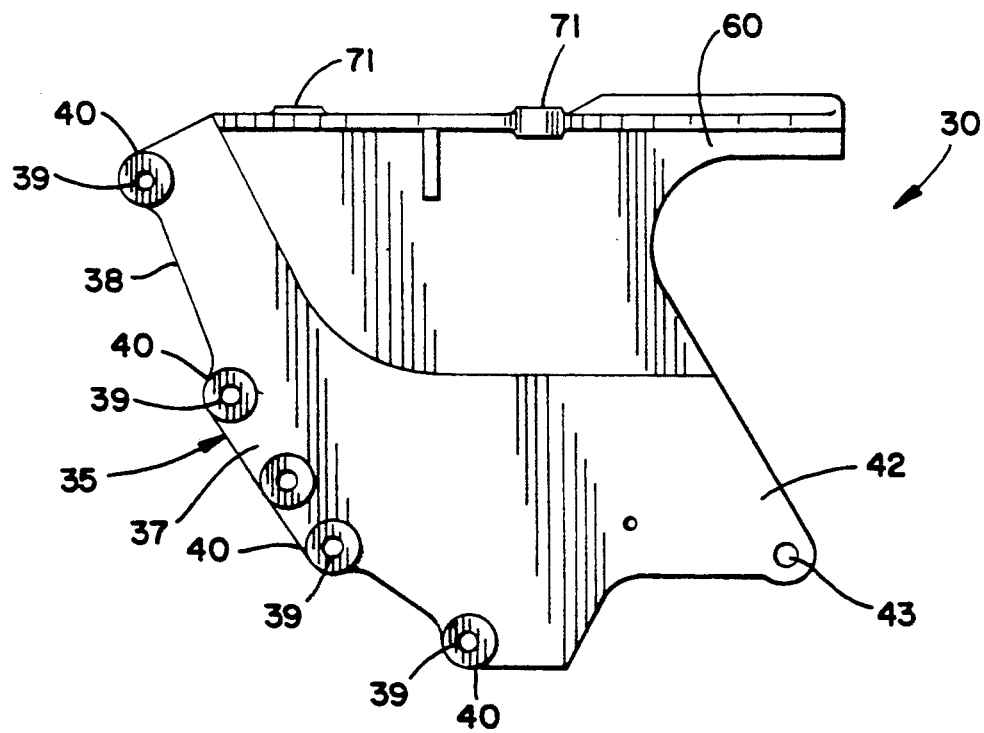
FIG. 4 is a rear view of the bracket of FIG. 3.

In the ensuing description, it will be appreciated that terms such as "fore-and-aft," "outermost," "lateral," "front," "rear," "above," and "below," should be taken to mean the positions when the mounting apparatus is installed on the engine and should only be taken as an indication of the relative positions of the various elements of the invention when the apparatus is not attached to the engine.

Referring now to the drawings in greater detail, there is illustrated therein a front portion of a heavy truck engine 11, preferably a Series 60 Diesel Engine manufactured by Detroit Diesel Corporation, incorporating the modular accessory mounting apparatus 10 of the present invention.

The apparatus 10 accommodates the mounting of several engine components to the engine 11, these being an air conditioning compressor 12, in a manner accommodating its associated drive belt 14, and an automatic belt tensioning pulley assembly 16 for the drive belt 14, a coolant system anticorrosion conditioning filter 18, and an alternator 20, in a manner accommodating an alternator drive belt 22 engaged thereto. The apparatus 10 eliminates the need for a plurality of brackets to separately mount these components and thus reduces plant labor time in mounting of the plurality of heretofore required attachment brackets, by integrating several design functions into a single unit. Further, by eliminating the need for such a plurality of mounting brackets, the required inventory of materials is reduced. Still further, as will be described in greater detail hereinafter, the apparatus 10 is maintenance effective as well, providing automatic or constant belt tensioning for the air conditioning compressor drive, eliminating the need for adjustment of belt tensioning as well as providing a more than adequate belt life, with service to the belt only being required upon failure and replacement thereof.

Turning now to a study of the modular accessory apparatus 10 itself, a unitary multiple engagement bracket 30 incorporating an internal cavity 31 is slidingly engaged over a corner of a front cover 32 of diesel engine 11 and secured thereto. As shown, the bracket 30 which is preferably a steel casting, has a fore and aft extending interior wall 35 joined by parallel forward and rearward walls or lateral flanges 37 and 38 depending downwardly in spaced relation therefrom to form the internal cavity 31 the walls being spaced a distance equal to the thickness of the front cover 32 so that the interior cavity will snugly slide over a contiguous portion of a side wall 36 of the engine front cover 32. The lateral flange 37 is provided with bolt receiving apertures 39 while the lateral flange 38 is provided with bolt apertures 39 and also bolt supporting bosses 40 so that the bracket 30 may be secured engaged to the front cover 32, such by bolts passing through the front cover and the lateral flanges 37 and 38.

As best seen in FIG. 2, the alternator 20 includes two parallel radially extending mounting flanges 41 between which the outermost end or ear 42 of the bracket 30 from the front cover seats snugly, the fore-and-aft extent of the ear 42 is narrower that the exterior spacing of the lateral flanges 37 and 38 at the front cover 32 and it can be seen in FIG. 8 that the forward wall portion 37' defining the front of the ear 42 is offset rearwardly from the forward wall 37. The ear 42 is provided with a fore-and-aft extending bore 43 therethrough which aligns with mounting bores 44 in the flanges 40 and 41 of the alternator 20 for receipt of a mounting bolt 45 therethrough, from which the alternator 20 depends and about which it pivots for adjustment.

For secure positioning of the alternator 20 in a manner to produce appropriate tensioning in the drive belt 22 therefore, a threaded adjusting arm 48 is secured at one end 52 to a portion of the front cover 32 therebeneath and at the other end 53 thereof is slidably secured to a bottom flange 54 of the alternator 20, in a known manner, to allow for appropriate positioning of the alternator 20 relative to an engine mounted drive unit 56 thereof for proper tensioning of the belt 22 extending therebetween.

The horizontal upper wall portion 50 of the bracket 30 is disposed between the forward and rearward walls 37 and 38 at the innermost end of the bracket 30 and extends laterally outwardly and forwardly therefrom to a mounting plate or pad 60 ahead and above the outermost end or ear 42 of the bracket 30. The mounting pad 60 is provided with mounting holes for securely attaching as by bolts the header of the coolant system corrosion filter 18 which depends downwardly therefrom downwardly therefrom to a position forwardly above the alternator drive belt 22 so as not to interfere with the operation of same.

Formed on the upper wall portion 50 slightly above and rearwardly of the mounting pad 60 is a further mounting platform 70 formed by two planar in line bosses 71 upon which the air conditioning compressor 12 is seated and securely mounted by bolts. A drive pulley 72 of the air conditioning compressor 12 is engaged by the drive belt 14 thereof to a fan drive pulley 75 of the engine.

To produce appropriate tension in the drive belt 14, the constant tension pulley assembly 16 is attached below the compressor 12 to a circular boss 78 formed on the forward wall 37 of the bracket 30 and having a fore-and-aft extending axis. The constant tension pulley assembly 16 pivots about the axis of the boss 78 to engage the belt 14 for the compressor 12 at a point 80 between the compressor pulley 72 and the fan drive pulley 75.

It has been found through empirical testing that the provision of the apparatus 10 can produce a reduction in assembly operations typically required of approximately fifty percent, a reduction in required parts of approximately forty five percent and a reduction in assembly labor time, and thus the cost thereof, of approximately forty five percent as well, creating an extremely cost effective mounting apparatus 10.

As described above, the apparatus 10 has a number of advantages, some of which have been described above and others of which are inherent in the invention.

Also, modifications may be proposed to the apparatus 10 without departing from the teachings herein. Accordingly the scope of the invention should only be limited as necessitated by the accompanying claims.

What is claimed is:

1. An accessory mounting apparatus for use on a heavy duty engine, the apparatus comprising a unitary structure configured for secure engagement with a front cover of an engine, said unitary structure including spaced walls defining an interior cavity of said structure, said interior cavity being configured to snugly receive thereinside a side portion of the front cover of the engine, and including means for mounting an alternator thereon, means for mounting a coolant corrosion filter thereon, means for mounting an air conditioning compressor thereon, and means for mounting a constant tensioning belt idler on said unitary structure in a position disposed to engage an air conditioning compressor drive belt.

2. The apparatus of claim 1 wherein the width of said interior cavity is substantially equal to the thickness of the front cover.

3. The apparatus of claim 1 wherein alternator mounting means of said bracket includes an outermost ear portion having a bore to which the alternator is dependingly engaged in a plurality of adjustably fixed positions of said alternator for tensioning of an alternator drive belt.

4. The apparatus of claim 3 wherein said bracket further includes an integrally formed horizontal upper plate portion including a mounting pad disposed above and forwardly of said ear portion of said bracket, said coolant corrosion filter mounting means comprising means on said mounting pad for mounting a header of said filter in depending relation therefrom.

5. The apparatus of claim 4 wherein said horizontal upper plate portion further includes a planar mounting platform rearwardly and laterally inwardly of said mounting pad, said air conditioning compressor mounting means comprising means on said mounting platform for securing said compressor thereabove.

6. The apparatus of claim 5 and said bracket further including a mounting boss disposed on a forward wall of said bracket beneath said mounting platform and extending perpendicularly thereto, said boss including said means for mounting said a constant tension pulley to said bracket.

7. A bracket for mounting thereon a plurality of components of a heavy duty engine, the bracket including means for dependingly mounting an alternator, means for supported mounting of an air conditioning compressor, and means providing the sole cantilevered mounting to said engine of a constant belt tensioning idler, said bracket further including an integrally formed horizontal upper plate portion having a planar mounting platform, said air conditioning compressor mounting means comprising means on said mounting platform for securing said compressor thereabove 8. The bracket of claim 7 further including a mounting boss disposed on a forward wall of said bracket beneath said mounting platform and extending perpendicularly thereto, said boss including said means for mounting said a constant tension pulley to said bracket.

9. The bracket of claim 7 further including a mounting pad disposed on said horizontal plate portion forwardly outwardly of said mounting platform, and means on said mounting pad for dependingly mounting a coolant system corrosion filter therefrom.

10. The bracket of claim 7 wherein said alternator is engaged thereto in a manner where it is movable to a position producing a tensioning effect upon a drive belt extending between said alternator and an engine mounted drive therefore, and lockable in that position.

11. The bracket of claim 10 including an outermost ear portion to which the alternator is dependingly engaged.

12. In combination with a heavy duty engine having a front cover, an air conditioning compressor, an alternator, a drive pulley, and belts for driving said compressor and said alternator, an improved accessory mounting apparatus for mounting said compressor and alternator comprising:
- a unitary structure having spaced laterally extending walls defining an internal cavity disposed over and secured to a side portion of said engine front cover
- said laterally extending walls extending laterally away from said front cover to an outermost ear portion to which an alternator is dependingly engaged in adjustably fixed position to accommodate tensioning of a drive belt extending between the alternator and said engine pulley,
- said laterally extending walls extending upwardly to an integral horizontal platelike portion defining a mounting platform upon which said air conditioning compressor seats, said platform being positioned to allow a drive belt to be engaged between a pulley of said compressor and said engine drive pulley, and
- a mounting boss disposed on a forwardmost one of said laterally extending walls beneath said platform, and a constant tensioning belt idler assembly mounted on said mounting boss and operatively engaging said compressor drive belt.

13. The combination of claim 12 and said horizontal platelike portion extending forwardly outwardly from said mounting platform and a mounting pad formed thereon positioned forwardly of said ear portion, and a coolant corrosion filter mounted on said mounting pad and depending therefrom to a distal end disposed forwardly above said alternator without interference with said alternator drive belt.

14. A bracket for mounting thereon a plurality of components of a heavy duty engine, the bracket including means for dependingly mounting an alternator, means for supported mounting of an air conditioning compressor, means providing the sole cantilevered mounting to said engine of a constant belt tensioning idler, and a constant tensioning belt idler mounted on said mounting means.

15. A bracket for mounting thereon a plurality of components of a heavy duty engine, the bracket including means for dependingly mounting an alternator, means for supported mounting of an air conditioning compressor, and means providing the sole cantilevered mounting to said engine of a constant belt tensioning idler, said bracket further including spaced walls defining an interior cavity of said structure, said interior cavity being configured to snugly receive thereinside a side portion of the front cover of the engine.

* * * * *